Figure 1:
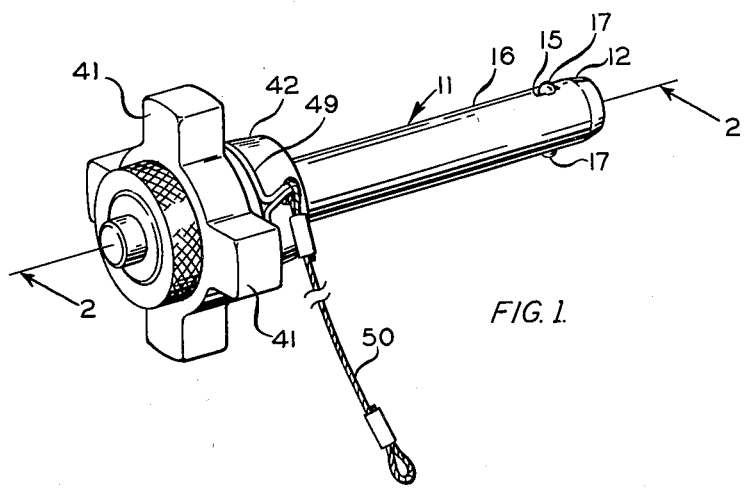

Aug. 27, 1963    E. E. WALKER ETAL    3,101,641
ADJUSTABLE BALL PIN
Filed Nov. 4, 1960

INVENTORS
EARL E. WALKER and ORVILLE C. MILLER
BY
THEIR ATTORNEY

3,101,641
ADJUSTABLE BALL PIN

Earl E. Walker, Kirkwood, and Orville C. Miller, Maplewood, Mo., assignors to Carr Lane Manufacturing Co., St. Louis County, Mo., a corporation
Filed Nov. 4, 1960, Ser. No. 67,315
2 Claims. (Cl. 85—5)

This invention relates to releasable securing devices, such as ball pins commonly used for joining the parts of industrial fixtures releasably together. Such ball pins have a hollow, hardened stem inserted through mating bores in the parts to be joined, the stem terminating in an abutment surface to be pressed against the top side of the parts; and depressable or retractable ball detents near the tip of the pin, to engage the parts on their bottom side.

It is a requirement of releasable securing devices that the length of the stem from the detent to the abutment surface be precisely sized to fit the parts which are to be held together, so that they may be held tightly; and no part of the smooth, hardened stem surface can be interrupted by threads.

The objects of the present invention are to improve such releasable securing devices by making their length adjustable, to assure precise tight fit, and to secure a wide range of adjustment whereby to minimize the number of lengths of such securing devices which must be carried in stock. As applied specifically to releasable ball pins, further objects include taking the spring load off of the detent balls, and also excluding foreign matter, such as, paint, from the interior of the ball pin.

These, and other objects which will be apparent from the specification, are achieved in the present invention by mounting near the outer end of the stem of the ball pin, an externally-threaded sleeve member which provides both for adjustment of length and for exclusion of foreign matter. It is of greater diameter than the cylindrical wall of the ball pin stem, and on it screws a handle having at its inner side an annular abutment surface presentable against the fixture parts to be joined and retained by a locking member, such as a lock nut, to hold it at whatever length it may be adjusted. The maximum length is utilized when the annular abutment surface is positioned axially in registration with the inner end of the sleeve member; but handle may be screwed down the sleeve so as to shorten the effective length of the ball detents. The adjustment length is therefore limited principally by the thickness of the handle. The sleeve member has at its outer end a radially inward flanged portion including an annular seating surface; and the plunger within the tubular stem (which when depressed permits the detents to retract inwards) has an annular, outward-facing shoulder which closes and seals against this seat surface to prevent entry of foreign matter.

This invention may, therefore, be considered as an adjustable length, sealed, releasable securing device. It combines a tubular stem pin having detent means adjacent its inner end with a relatively thick annular member (such as the handle illustrated) whose inner diameter is greater than the diameter of the cylindrical pin surface and whose inward face is the surface which abuts against the outer side of fixture parts to be joined. It includes means, such as external threads, to mount the thick annular member onto the stem adjacent the outer end of its cylindrical surface and adjustably to set the space from the annular member to the detent means at some variable length less than the length of the cylindrical surface as measured from the detents. Such mounting means has an annular seat within its outer edge, against which the detent-releasing plunger is seated sealingly.

Figure 2:
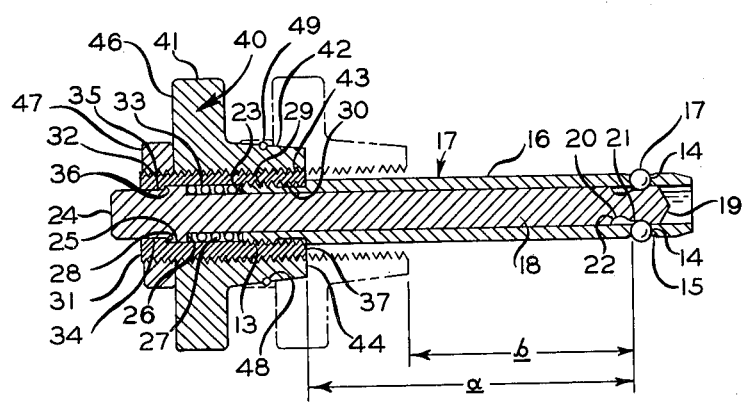

In the accompanying drawings:
FIGURE 1 is a perspective view of an adjustable-length releasable securing device embodying the present invention.
FIGURE 2 is a sectional view taken along line 2—2 of FIGURE 1. The dashed lines show the position of the parts when adjusted to a length substantially less than the maximum length for which the pin may be used.

Referring to the figures by detail part numbers, there is provided a tubular stem pin generally designated 11 having a tapered tip 12, an externally-threaded end portion 13 at the end opposite the tip, and a plurality of ball apertures 14 through the stem wall adjacent to the tapered tip 12, each ball aperture having at its outer side one or more restricting projections 15, as may be formed by staking after balls are inserted therethrough. The outer cylindrical surface 16 of the pin 11 is hardened and smooth.

Within each of the ball apertures 14 is a small hardened steel detent ball 17 of sufficient diameter to be restricted from escape by the staked restricting projections 15. The surface of the balls 17 projects through and sufficiently beyond the outer cylindrical surface 16 to serve as detent means for the ball pin device.

Within the tubular stem pin 11 a reciprocal plunger 18 is slidingly received. The plunger has a tapered tip 19. In the side surface of the plunger adjacent to its tip is machined an annular cam notch 20. It includes a relatively shallow portion 21 nearer the tip, of such depth as to cause the balls 17 to project radially beyond the cylindrical surface 16; and a deeper portion 22 thereadjacent, of a depth sufficient to permit the balls 17 to retract or recede inwardly, as far as the cylindrical surface 16.

The length of the plunger 18, measured outwardly from its cam notch 20, is substantially greater than the length of the pin 11 measured outwardly from the ball aperture 14, so that the plunger 18 extends well beyond the outer end 23 of the pin 11. Beyond the pin outer end 23 but inward of the plunger end 24, the plunger 18 has an annularly enlarged portion 25 faced on its inner side by an inward facing abutment 26, against which a compression spring 27 bears and presses it outwardly from the pin outer end 23. On the outer side of the annular enlarged portion 25 is an outward facing annular shoulder 28 which serves as one of two mating surfaces for excluding foreign matter, as hereinafter described.

The outer surface of the pin 11 immediately inward of its outer end 23 is threaded as at 29. These threads 29 mount complementary inside threads 30 at the inner end of a steel sleeve designated 31. The sleeve 31 extends well beyond the outer end of the pin 11 and beyond the plunger annular enlarged portion 25, and is externally threaded over its entire length as at 32. Its external threads 32 are used for adjustment and locking purposes as hereinafter described. Outwardly adjacent to the inside threads 30 of the sleeve 31, the sleeve has an unthreaded inner cylindrical surface 33 of greater diameter than the plunger annularly enlarged portion 25; but at the outer end of the sleeve 31 such diameter is diminished by the provision of an integral-inward extending flange 34, which terminates in a central axial bore 35 in which the plunger end 24 is accommodated for reciprocation.

Joining the inner end of the bore 35 to the inner cylindrical surface 33 is an inwardly-presented annular seat surface 36 against which the shoulder 28 closes sealingly. The spacing of the annular seat surface 36 from the ball apertures 14 is at most equal to and preferably slightly less than the length (measured along the plunger 18) from the shoulder 28 to the inner end of the cam notch 20; so that when the plunger shoulder 28 is seated against the annular seat surface 36, the cam notch 20 exerts no substantial axial force against the balls 17, such as might otherwise tend to indent them.

Mounted adjustably upon the external threads 32 of the sleeve 31 is a relatively thick handle, generally designated 40. It includes a grip portion 41, which may be generally cruciform as illustrated, or of any other convenient shape. At the inner side of the grip portion 41 is an integral hub or boss 42. The entire handle 40 has internal threads 43 which mate with the external threads 32 of the sleeve 31 for adjustment by screwing. As illustrated in FIGURE 2, the effect of such adjustment is to move the handle 40 and thus change the relative position of its machined inward-facing annular abutment surface 44, formed at right angles to the thread axis. Save for the necessity of keeping two or three threads in contact, the length of adjustment of the pin is thus limited by the thickness of the handle 40. The longest usable length designated $a$ is achieved when the surface 44 is in axial registration with the inner end 37 of the sleeve 31. The effective length may be shortened by an amount almost equal to the entire width of the handle 40 (that is, the grip portion 41 and the hub 42 combined) by screwing it inwardly to the length $b$ shown in dashed lines in FIGURE 2.

At the outer side of the handle 40 (that is, opposite its abutment surface 44), the handle has an outward faced surface 46, against which engages the inner side of a lock nut 47, also threaded onto the sleeve external threads 32.

Inwardly of the grip portion 41, the hub 42 has a groove 48 which mounts a wire loop 49 carrying one end of an attachment cable 50 whose opposite end may be attached to the jig or fixture. Such cables are used for suspending ball pins from their fixtures so that they will not be lost when the ball pins are removed from engagement with the parts.

Throughout the range of adjustment of its length, the entire exposed portion of the cylindrical surface 16 is smooth and uninterrupted by any threads. Accordingly, this adjustable ball pin fulfills a broad range of length requirements, making it unnecessary to stock numerous lengths of ball pins. Furthermore, its adjustment feature makes certain that minute and precise length adjustment will be had so that the parts of the fixture or other material to be held together will in all cases be accommodated tightly and precisely.

To engage the ball pin through bores in fixtures or other pieces which it is to hold, the plunger end 24 is depressed against the resistance of the spring 27, permitting the detent balls 17 to retract or recede inwardly into the deeper portion 22 of the cam notch 20. When pressure on the plunger end 24 is released, the compression spring 27 draws the plunger outward so that its abutment 26 seats and seals against the annular seat surface 36. Both of these are precisely machined and seal tightly against each other when so seated. All foreign matter such as paint, dirt, etc. is positively excluded.

No prior construction effects such sealing, nor utilizes for such purpose a sleeve which both provides a seat surface 36 and also permits adjustment of pin length.

In the light of the present invention, possible modifications and changes will occur to those familiar with the problems of the art, to achieve the new functions and advantages in somewhat analogous ways and by the substitution of generally equivalent mechanical means. Accordingly, this invention is not to be construed narrowly but instead as fully co-extensive with the claims hereof.

What is claimed and to be protected by patent is:

1. An adjustable-length ball pin comprising a tubular stem having a ball aperture at an inner end thereof and a threaded portion at an outer end opposite said inner end and a smooth outer cylindrical surface between the ball aperture and the threaded portion, a ball within the aperture and of such diameter as to project therethrough, a plunger received within the tubular stem having a ball-accommodating cam notch adjacent to its tip, the cam notch including a shallow portion of such depth as to project the ball beyond the outer cylindrical surface and a portion thereadjacent of such depth as to permit the ball to recede inwardly of the cylindrical surface, the plunger further having an annularly enlarged portion adjacent its outer end, said portion having an inward-facing abutment and an outward-facing annular shoulder, further comprising a helical spring compressed between the inward-facing abutment and the outer end of the tubular stem, an externally-threaded sleeve of greater outer diameter than the pin and of greater inner diameter than the annular enlargement of the plunger, the sleeve having at its inner end internal threads engaging the threaded outer end of the pin, and having at its outer end an inward-extending flange terminating in a central bore in which the plunger is accommodated for reciprocation and forming an inwardly-presented annular seat surface against which the annular shoulder is pressed by the spring, further comprising a handle having an axial bore internally threaded to mate with the threads on the external surface of the sleeve, the handle having a boss terminating in an inward-facing annular abutment surface, and means to restrain said handle from inadvertent rotation.

2. An adjustable-length ball pin comprising a tubular stem having a tapered tip, a threaded end portion at the end opposite said tip, a ball aperture through the stem wall adjacent to the tapered tip having a ball restriction, and a hardened outer cylindrical surface between the ball aperture and the threaded portion, a ball within the aperture and of such diameter as to project therethrough, a plunger received within the tubular stem having a ball-accommodating cam notch adjacent to its tip, the cam notch including a shallow portion of such depth as to project the ball beyond the outer cylindrical surface and a portion thereadjacent of such depth as to permit the ball to recede inwardly of the cylindrical surface, the plunger further having an annularly enlarged portion adjacent its outer end, said portion having an inward-facing abutment and an outward-facing annular shoulder, further comprising a helical spring compressed between the inward-facing abutment and the outer end of the tubular stem, an externally-threaded sleeve of greater outer diameter than the pin and of greater inner diameter than the annular enlargement of the plunger, the sleeve having at its inner end internal threads engaging the threaded outer end of the pin, and having at its outer end an inward-extending flange terminating in a central bore in which the plunger is accommodated for reciprocation and forming an inwardly-presented annular seat surface against which the annular shoulder is pressed by the spring, further comprising a handle having an axial bore internally threaded to mate with the threads on the external surface of the sleeve, the handle having a boss terminating in an inward-facing annular abutment surface, further comprising an internally-threaded lock nut mounted on the external threads of the sleeve member outwardly of the handle.

References Cited in the file of this patent

UNITED STATES PATENTS

| | | |
|---|---|---|
| 2,439,531 | Wallace | Apr. 13, 1948 |
| 2,515,807 | Spooner | July 18, 1950 |
| 2,779,228 | Meepos et al. | Jan. 29, 1957 |

FOREIGN PATENTS

| | | |
|---|---|---|
| 353,093 | Italy | Oct. 5, 1937 |